United States Patent [19]

Minakuchi

[11] 4,242,618
[45] Dec. 30, 1980

[54] SPEED CONTROLLER FOR ROTARY MACHINE

[75] Inventor: Hiroshi Minakuchi, Shiga, Japan

[73] Assignee: Matsushita Electric Industrial Co., Ltd., Kadoma, Japan

[21] Appl. No.: 870,982

[22] Filed: Jan. 20, 1978

[30] Foreign Application Priority Data

Jan. 25, 1977 [JP] Japan ................................ 52-7479

[51] Int. Cl.³ .......................................... H02P 5/16
[52] U.S. Cl. ................................ 318/314; 318/318; 318/341
[58] Field of Search .............. 318/314, 318, 326, 327, 318/328, 341

[56] References Cited

U.S. PATENT DOCUMENTS

| 3,340,951 | 9/1967 | Vitt .................... 318/314 |
| 3,388,764 | 6/1968 | Wood .................... 318/314 |
| 3,820,893 | 6/1974 | Donohue et al. ............ 318/314 UX |
| 4,015,180 | 3/1977 | Tetsugu et al. ............ 318/314 |
| 4,041,362 | 8/1977 | Ichiyanagi ................ 318/318 |
| 4,114,075 | 9/1978 | Minakuchi ................ 318/318 |

Primary Examiner—B. Dobeck
Attorney, Agent, or Firm—Cushman, Darby & Cushman

[57] ABSTRACT

An apparatus for controlling rotation speed of a rotary machine such as a motor, the controlling being made by controlling astable period of output signal of monostable circuit 5, aimed at controlling the rotating speed of the rotary machine such as turntable of a record player and aimed at a drawing in phase control. The apparatus determines astable period of the monostable circuit by means of frequency of a signal from a reference frequency generator $6+7+8$ or $6+7+9$.

5 Claims, 10 Drawing Figures

SPEED CONTROLLER FOR ROTARY MACHINE

BACKGROUND OF THE INVENTION

1. Field of the Invention

The present invention relates to a rotary speed controller for controlling the rotating speed and a rotary controlling phase of a rotary machine by using a monostable circuit as a synchronous pull-in means for obtaining a DC voltage responsive to the rotating speed of the rotary machine. Tracking of synchronous pull-in conditions is satisfactorily achieved for change-over from one speed to another or for fine control of the rotating speed of the rotary machine, by changing the astable period of a monostable circuit responsive to the change of a reference frequency for speed change-over or to the fine frequency control of a reference signal source.

Prior Art

As for a conventional apparatus, for example, to control the rotation speed of the turntable of a record player precisely, it requires phase comparison means which compares a reference frequency signal obtained from a reference frequency oscillator using a solid vibrator such as a crystal vibrator with the output signal from the rotating speed detector (such as frequency generator) connected with said turntable.

Synchronous pull-in means is also necessary, which draws the rotating speed of said turntable to the setting value, to make said phase comparison in a satisfactory condition.

As for said synchronous pull-in means, the output signal of said rotating speed detector is transformed to the signal, whose average level changes in accordance with the rotating speed of said turntable. As a most general example, the output signal of said rotating speed detector is applied to a monostable circuit, and DC voltage, which changes in accordance with the rotating speed of said turntable, is usually obtained, by smoothing output signals of said monostable circuit by an integration circuit. Two standard rotating speeds of record player are 33⅓ rpm and 45 rpm; in some cases the precise control within several % is often requested for both rotating speeds. Among change-over methods of the rotating speed, prior art method is varying said reference frequency of the apparatus or changing-over, which requires to reset the astable period of said monostable circuit, since the synchronous pull-in condition changes.

Therefore, in the conventional method, one changes the resistors which set astable period of said monostable circuit in accordance with the change-over of reference frequency. However, in this method, more than two switch circuits are required, and this leads to the complication of the structure of the apparatus and the wiring. When one needs the precise control of the rotating speed, it needs to control the reference frequency precisely, sacrificing synchronous drawing characteristics, or alternatively, it needs to employ the precise control mechanism of astable period which is related to control mechanism of reference frequency.

SUMMARY OF THE INVENTION

An object of the invention is to overcome the above-mentioned problems of the rotating speed control apparatus of the rotary machine. Another object of the invention is to provide the rotating speed control apparatus of rotary machine which can control the number of revolutions using a precise frequency of a reference oscillator.

DETAILED DISCLOSURE OF PREFERRED EMBODIMENT

Figure 1:
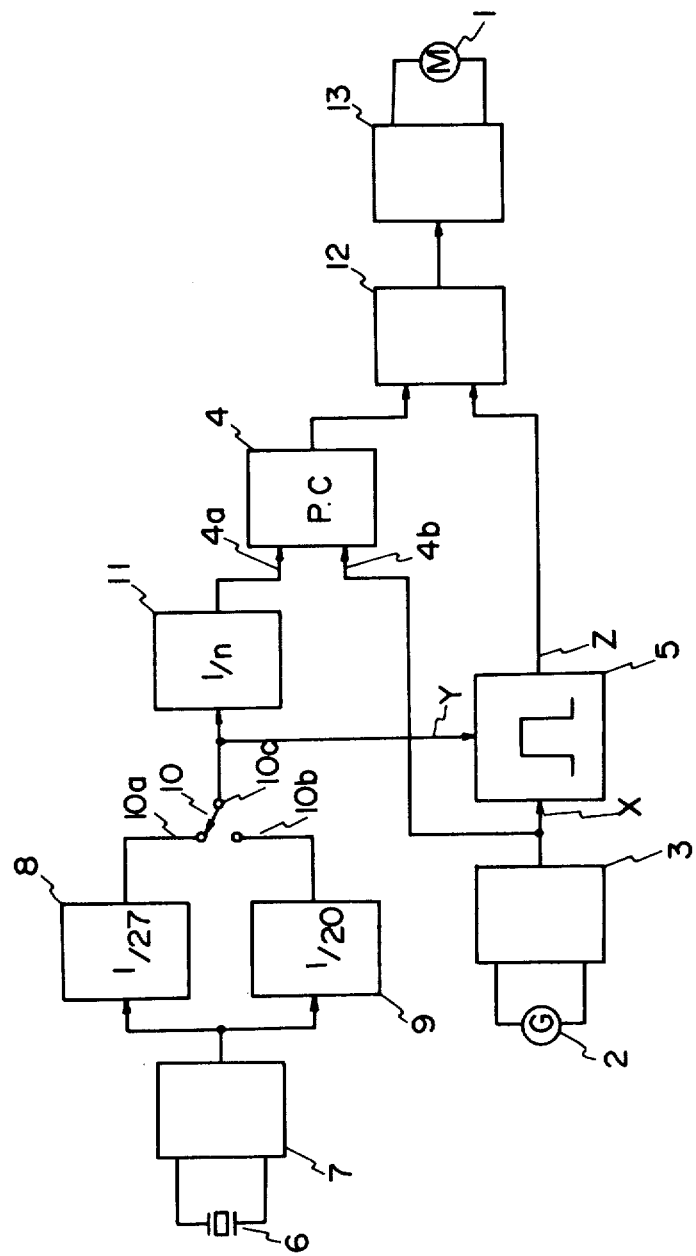
FIG. 1 is a block diagram of the rotating speed control apparatus of turntable as one practical example of the invention.

For one practical example of the invention, a block diagram of the rotating speed control apparatus of a rotary machine is given in FIG. 1. FIG. 1 shows the rotating speed control apparatus for a turntable of a record player. A speed detector 2 is coupled to a motor 1, which is coupled to the turntable (not drawn) and the output terminal of the speed detector 2 is connected to the input terminal of an amplifier 3. The output terminal of the amplifier 3 is connected to the input terminal 4b of a phase comparator (P.C.) 4 and to the input terminal X of a monostable circuit 5.

The output terminal of a reference oscillator 7 using a solid vibrating device 6 such as a crystal vibrating device, is connected to a 1/27 frequency divider 8 and a 1/20 frequency divider 9. The output terminal of the divider 8 is connected to one fixed terminal 10a of a change-over switch 10, the output terminal of the divider 9 is connected to the other fixed terminal 10b of the change-over switch. The traveling contact (common contact) 10c of the change-over switch 10 is connected to the input terminal of a 1/n frequency divider 11 and also to the control input terminal Y of the monostable circuit 5. The output of the divider 11 is applied to the other input terminal 4a of the phase comparator 4. The output terminal of the phase comparator 4 and the output terminal Z of the monostable circuit 5 are connected to input terminals of a mixing circuit 12 to mix signals thereof in the mixing circuit 12. The output terminal of said mixing circuit 12 is given to the motor driving circuit 13, to the output terminal of which is connected the motor 1.

Among the blocks shown in FIG. 1, the function of the amplifier 3 is to amplify the alternating signal of small amplitude, coming from the speed detector 2, until obtaining an rectangular wave having amplitude of supplying voltage. The amplifier can easily be composed by ordinary transistor operational amplifiers and inverters of digital IC, etc. which are available on the market. The function of the phase comparator 4 is to obtain the output signal (digital or DC signal) having the average level in accordance with the phase difference of the signal applied to both input terminals. The phase modulator was well known as demodulation circuit of phase modulation (PM) for a long time and is now well known as one building element of PLL (phase-locked loop).

Many kinds of ICs including the phase comparator, for example Motorola MC-4044 for bipolar, RCA CD-4046 for CMOS IC, etc. are marketed from several companies. For the reference oscillator 7 using transistors, several kinds of oscillator circuits such as Colpitts oscillator circuit and others, are well known. When CMOS digital IC is used, the reference oscillator 7 is easily constructed by connecting a feed-back resistor and the solid vibrating device 6 between in- and output terminals of the inverter. The dividers 8, 9 and 11 are easily realizable by a reset circuit consisting of flip-flop and NAND gate (or AND gate). Since the functions and constitutions of each block per se are known, detailed explanation of each block is not given here.

Figure 2A:
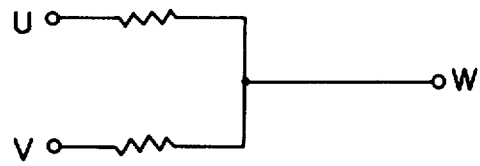
FIG. 2a, FIG. 2b and FIG. 2c are circuit diagrams of mixing circuits, which are a building element of the apparatus of FIG. 1.
Figure 2B:
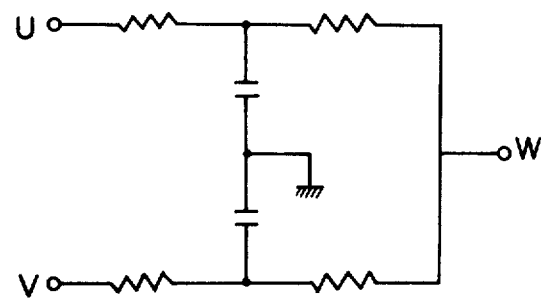
Figure 2C:
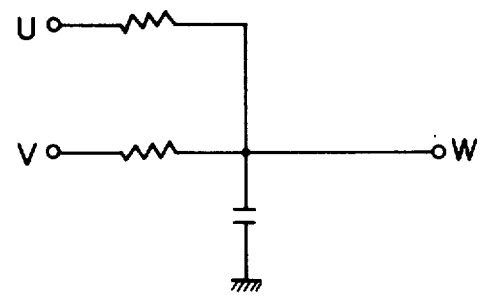

As for the mixer circuit 12, simple adder circuit by resistors is generally employed as shown in FIG. 2a, FIG. 2b and FIG. 2c. Terminals U and W are for input and terminal W is for output in these figures. The mixing circuit, shown in FIG. 2a, is most often used for setting the phase control gain by controlling the ratio of two resistors connected with terminals U and V. The mixer circuit 12 shown in FIG. 2b mixes the digital output signal from phase comparator 4 and digital output signal from monostable circuit 5, after smoothing into a DC signal by a smoothing circuit. The mixing circuit shown in FIG. 2c is the simplified one corresponding to FIG. 2b. Moreover, if it is desired to make the mixer more functional, the switching circuit, gate circuit, etc. are added to the mixer.

The motor driving circuit 13 is a circuit which controls voltage supply or current supply to motor 1 in accordance with the output voltage of mixing circuit 12, or which generates braking current, in the case of a brake servocontrol system (where an eddy-current brake by an electromagnet is used for an AC motor and the rotational speed of the AC motor is therefore controlled by the supply current to the electromagnet). Such a motor driving circuit 13 is well known, and accordingly a detailed explanation is not presented. The rotating speed control apparatus of FIG. 1 is constituted in such a manner that the output voltage of mixing circuit 12 decreases when the rotating speed of the motor 1 decreases or when the rotary controlling phase lags behind and that amount of the voltage supply from the motor driving circuit 13 to the motor 1 increases.

Among blocks shown in FIG. 1, monostable circuit 5 generates the output signal, which has astable period corresponding to any cycle of the signal which is applied to the control terminal Y during one cycle period of the signal of the input terminal X. That is, monostable circuit 5 has astable period determined by the frequency of the signal coming at the traveling contact 10c of the change-over switch 10. Repetition period of the output signal depends on the repetition cycle of the output signal from the speed detector 2.

Figure 3:
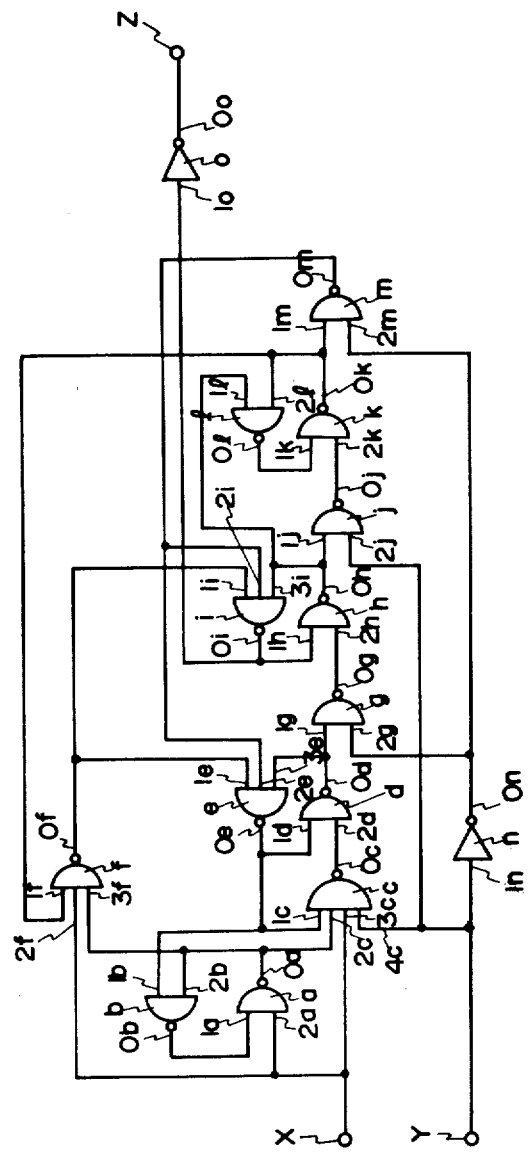
FIG. 3 is circuit diagrams showing the concrete example of the monostable circuit, which is a building element of the apparatus in FIG. 1.
Figure 4:
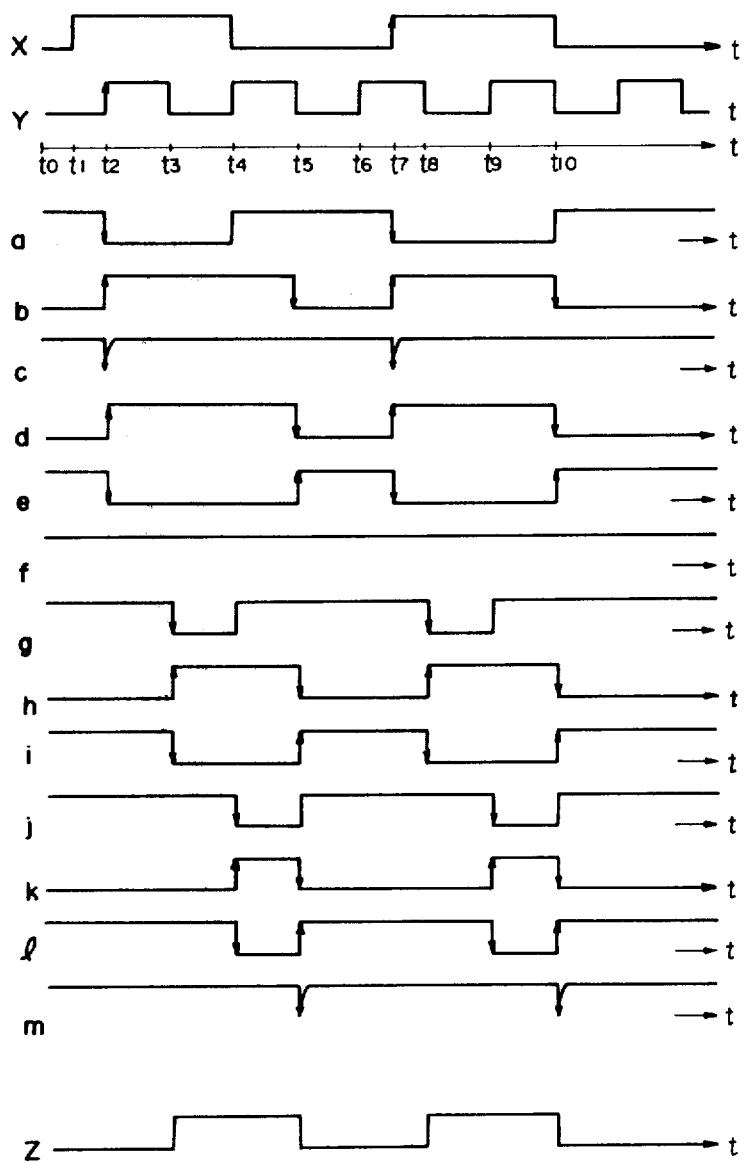
FIGS. 4 and 5 are signal waveforms which explain the function of the monostable circuit, shown in FIG. 3.
Figure 5:
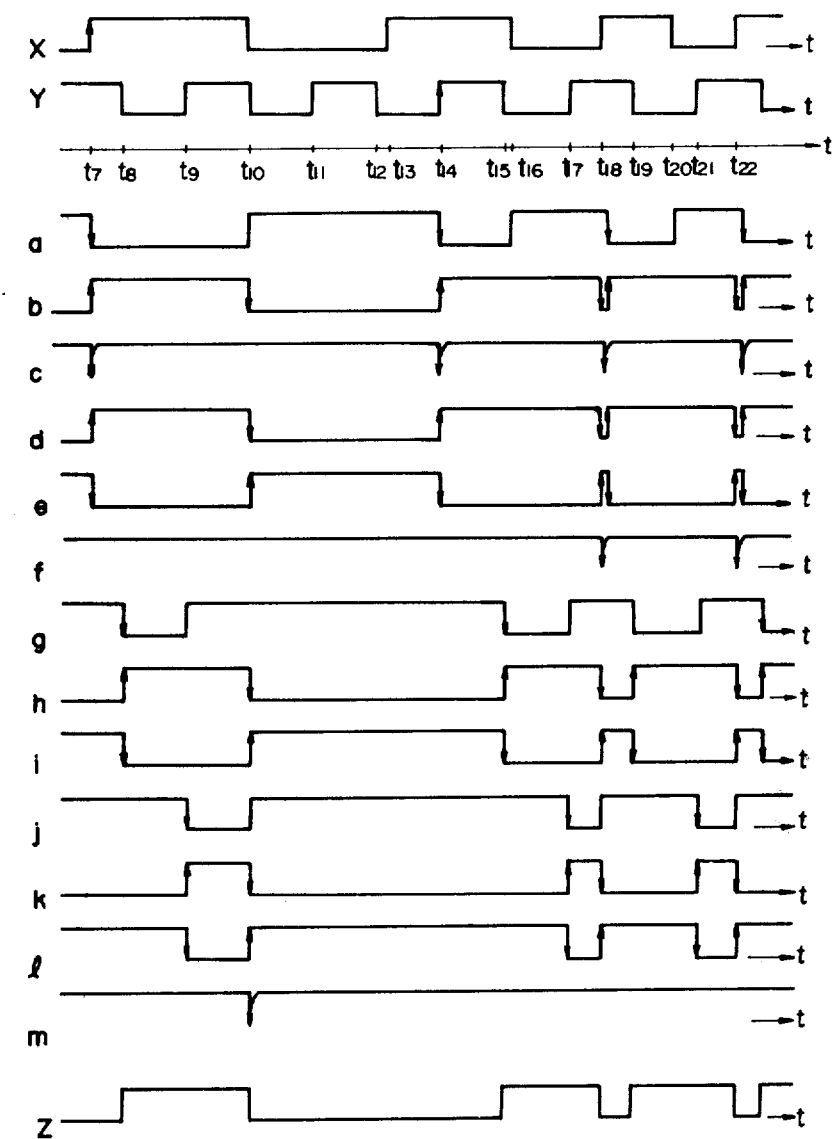
Figure 6:
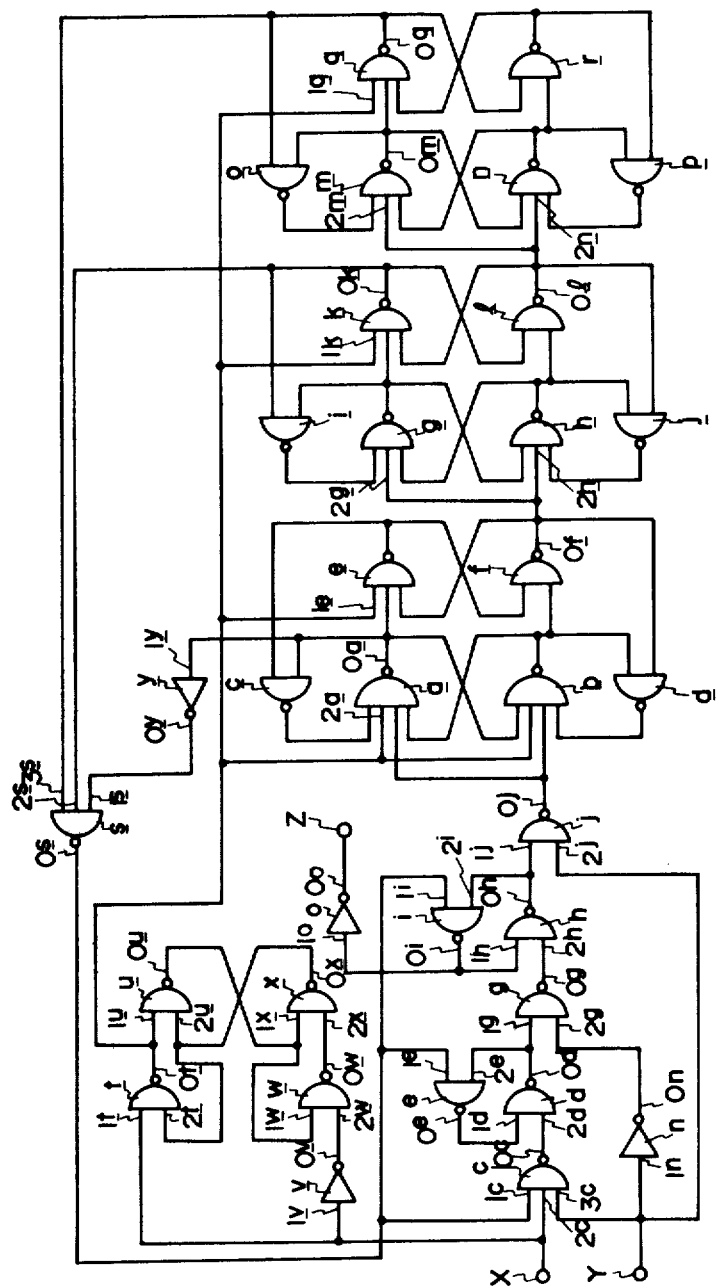
FIG. 6 is a circuit diagram which shows another practical example of the monostable circuit.
Figure 7:
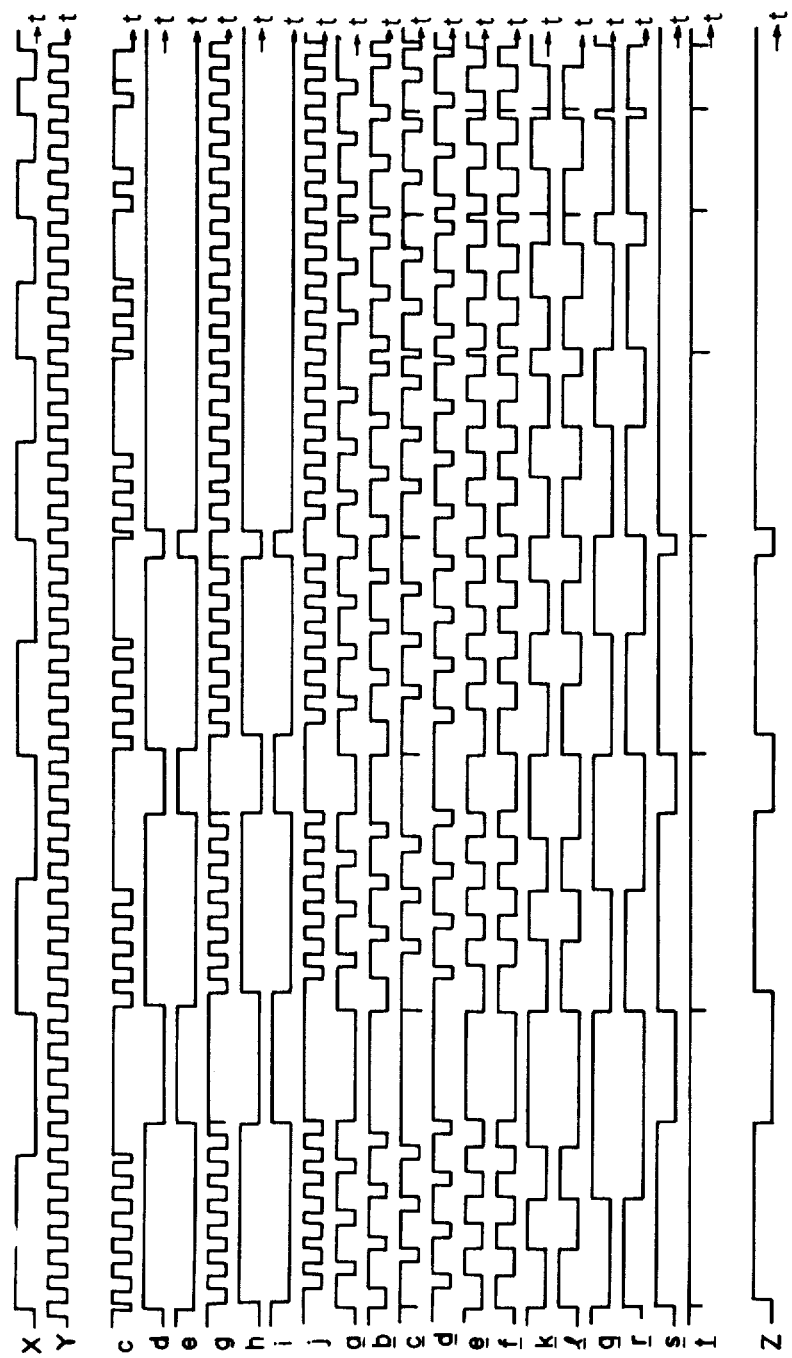
FIG. 7 is a signal waveforms diagram used for explaining the function of the monostable circuit of FIG. 6.

This construction is not well known. FIG. 3 is a fundamental construction example. Signal waveforms of various parts are shown in FIG. 4 and FIG. 5. As applied construction example and signal waveforms of various parts are shown in FIG. 6 and FIG. 7 respectively.

In FIG. 3, first signal input terminal X is connected to input terminal 2a of 2-input NAND gate a, input terminal 3c of 4-input NAND gate c and input terminal 2f of 3-input NAND gate f. Output terminal 0a of said 2-input NAND gate a is connected to input terminal 2b of 2-input NAND gate b, to input terminal 2c of said 4-input NAND gate c, moreover to input terminal 3f of said 3-input NAND gate f. Output terminal 0b of said input 2-input NAND gate b is connected to input terminal 1a of said 2-input NAND gate a.

The second signal input terminal Y, reference signal input terminal, is connected to input terminal 4c of said 4-input NAND gate c, input terminal 2j of 2-input NAND gate j and input terminal 1n of inverter n. Output terminal 0n of said inverter n is connected to input terminal 2g of 2-input NAND gate g and input terminal 2m of 2-input NAND gate m.

Moreover, output terminal 0c of said 4-input NAND gate c is connected to input terminal 2d of 2-input NAND gate d. Output terminal 0d of said 2-input NAND gate d is connected to input terminal 1g of said 2-input NAND gate g and to input terminal 3e of 3-input NAND gate e. Output terminal 0e of said 3-input NAND gate e is connected to input terminal 1d of said 2-input NAND gate d, to input terminal 1b of said 2-input NAND gate b and to input terminal 1c of said 4-input NAND gate c.

Output terminal 0g of said 2-input NAND gate g is connected to input terminal 2h of 2-input NAND gate h. Output terminal 0h of said 2-input NAND gate h is connected to input terminal 1j of said 2-input NAND gate j, to input terminal 3i of 3-input NAND gate i and to input terminal 1l of 2-input NAND gate l. Output terminal 0i of said 3-input NAND gate i is connected to input terminal 1h of said 2-input NAND gate h and to output terminal 1o of inverter o. Output terminal 0o of said inverter o is connected to signal output terminal Z.

The output terminal 0j of said 2-input NAND gate j is connected to input terminal 2k of 2-input NAND gate k. Output terminal 0k of said 2-input NAND gate k is connected to input terminal 1m of 2-input NAND gate m, to input terminal 2l of said 2-input NAND gate l and to input terminal 1f of said 3-input NAND gate f. Output terminal 0l of said 2-input NAND gate l is connected to input terminal 1k of said 2-input NAND gate k. Output terminal 0m of said 2-input NAND gate m is connected to input terminal 2e of said 3-input NAND gate e and to input terminal 2i of said 3-input NAND gate i. Output terminal 0f of said 3-input NAND gate f is connected to input terminal 1e of said 3-input NAND gate e and to input terminal 1i of said 3-input NAND gate i.

Now working function is explained for the case that signal of the waveforms shown in curves X and Y of FIG. 4 are applied to the signal input terminals X and Y of the monostable circuit 5:

At $t=t_0$, as levels at terminals X and Y are L (low level), the output level of NAND gate a is H (high level), and the output level of NAND gate c, the output level of NAND gate f and the output level of NAND gate j are H. And as NAND gate e and NAND gate i were reset by NAND gate m before $t=t_0$, both of their output levels are H. And accordingly, both output levels of NAND gate b and NAND gate d are L.

On the other hand, although the output level of inverter n is H, the output level of said NAND gate d is L, so the output level of NAND gate g becomes H, and hence the output level of NAND gate h becomes L, resulting in that the output level of NAND gate j also becomes H, the output level of NAND gate k is L.

Therefore, the output level of NAND gate m becomes H and the output level of the inverter o becomes L.

At $t=t_1$, although the signal level at terminal X turns from L to H, the output levels of NAND gate a, c, e, f, g, i, j, l and m hold H, since some of their input terminals are L.

At $t=t_2$, the signal level at terminal Y turns from L to H, and as levels of input terminal 1c, 2c and 3c of NAND gate c have already changed to H, the output level of said NAND gate c turns from H to L. At this moment, the output level of NAND gate d turns from L to H, and the output level of NAND gate e turns from H to L. Accordingly, the output level of NAND gate b turns from L to H, and hence, the output level of NAND gate a turns from H to L. If the output level of said NAND gate a turns from H to L, the output level of said NAND gate c goes back again from L to H. Curves a, b, c, d and e of FIG. 4 show the change of output levels of NAND gates a, b, c, d and e respectively.

At $t=t_3$, the signal level at terminal Y turns from H to L, and this time the level of input terminal 1g of NAND gate g has changed to H, the output level of said NAND gate g turns from H to L. Accordingly the output level of NAND gate h turns from L to H, and hence, the output level of NAND gate i turns from H to L. Curves g, h and i of FIG. 4 show the output level changes of NAND gate g, h and i respectively.

At $t=t_4$, the signal level at terminal X turns from H to L, so the output level of NAND gate a turns from L to H. Since the output level of NAND gate e is still L, output levels of NAND gate b and NAND gate c show no change. At the same time, $t=t_4$, the signal level at terminal Y turns from L to H, and the output level of NAND gate g turns from L to H. As the level of input terminal 1j of NAND gate j has changed to H, the output level of NAND gate j turns from H to L at this moment. Accordingly the output level of NAND gate k turns from L to H, and hence, the output level of NAND gate l turns from H to L.

Curves j, k and l of FIG. 4 show changes of output levels of NAND gates j, k and l respectively.

At $t=t_5$, when the signal level at terminal Y turns from H to L, by the H level signal given through the inverter n the output level of NAND gate m turns from H to L. And accordingly, output levels of NAND gate e and NAND gate i turns from L to H, and also the output level of NAND gate j turns from L to H. As the output level of said NAND gate e turns from L to H, output levels of NAND gate b and NAND gate d also turn from H to L. As the output level of said NAND gate i turns from L to H, the output level of NAND gate h turns from H to L. Accordingly the output level of NAND gate l turns from L to H, and hence, the output level of NAND gate k turns from H to L.

As the output level of said NAND gate k turns from H to L, the output level of NAND gate m agains goes back to H from L, but output levels of NAND gate e and NAND gate i do not change, since other input terminal has changed to L. curve m of FIG. 4 shows the output level change of NAND gate m. The signal of waveforms shown by curve Z of FIG. 4 comes out at signal output terminal Z.

At $t=t_6$, the signal level at terminal Y turns from L to H, but the output levels of NAND gates a, c, e, f, g. i, j, l and m do not change, since levels of some input terminals are L.

At $t=t_7$, the signal level of terminal X turns from L to H, then the output level of said NAND gate c turns from H to L, since levels at input terminals 1c, 2c and 3c of NAND gate c is H.

At this moment, the output level of NAND gate d turns from L to H, and the output level of NAND gate e turns from H to L. Accordingly, the output level of NAND gate b turns from L to H, and hence, the output level of NAND gate a turns from H to L. As the output level of said NAND gate a turns from H to L, the output level of said NAND gate c again goes back to H from L.

At $t=t_8$, the signal level at terminal Y turns from H to L, then the output level of NAND gate g turns from H to L, since the level at input terminal 1g of said NAND gate g has changed to H. Accordingly, the output level of NAND gate h turns from L to H, and hence, the output level of NAND gate i turns from H to L.

At $t=t_9$, the signal level at terminal Y turns from L to H, so the output level of NAND gate g turns from L to H, and hence, the output level of NAND gate j turns from H to L, since the level at input terminal 1j of said NAND gate j has changed to H. Accordingly the output level of NAND gate k turns from L to H, and hence, the output level of NAND gate l turns from H to L.

At $t=t_{10}$, when the signal level at terminal X turns from H to L, the output level of NAND gate a turns from L to H. And hence, when the signal level at terminal Y turns from H to L, the output level of NAND gate m turns from H to L, and accordingly, output levels of NAND gate e and NAND gate i turn from L to H, and the output level of NAND gate j turns from L to H.

When the output level of said NAND gate e turns from L to H, output levels of NAND gate b and NAND gate d turn from H to L. When the output level of said NAND gate i turns from L to H, the output level of NAND gate h turns from H to L. Accordingly, the output level of NAND gate l turns from L to H, and at the same time, the output level of NAND gate k turns from H to L. When the output level of said NAND gate k turns from H to L, the output level of NAND gate m goes back to H from L, but, the output level of NAND gate i holds H, since signals at other input terminals thereof turned to L. The output signal of the monostable circuit 5 shown by curve Z of FIG. 4 has an astable period corresponding to one cycle of the input signal Y applied to terminal Y. Signal waveforms shown by curve f of FIG. 4 shows that the output level of NAND gate f of FIG. 3 keep holding H level in the abovementioned stationary state operation shown in FIG. 4. The NAND gate f functions in case of transitional state described below.

The function of NAND gate f will become clear by reference to the output waveforms of all NAND gates in a similar manner as shown in FIG. 4, for the case when the repetition period of the signals applied to the input terminal X gradually becomes shorter and shorter (this case occurs when the motor 1 of FIG. 1 starts driving).

FIG. 5 is a signal waveform diagram, used for explaining the function of said NAND gate f. At $t=t_{14}$, when signal levels at terminal X and terminal Y become H, the output level of NAND gate c turns from H to L. Accordingly, the output level of NAND gate d turns from L to H, and hence, the output level of NAND gate e turns from H to L. Therefore the output level of said NAND gate c goes back to H and the output level of NAND gate b turns from L to H, and hence, the output level of NAND gate a turns from H to L.

The operations of all NAND gates at this moment are exactly the same as those at $t=t_2$ in FIG. 4. The change of the output levels from $t=t_7$ to $t=t_{10}$ in FIG. 5 correspond to those of the output levels from $t=t_7$ to $t=t_{10}$ in FIG. 4.

At $t=t_{15}$, the signal level at terminal Y turns from H to L, then the output level of NAND gate g turns from L to H, and hence, the output level of NAND gate i turns from H to L.

The operations of all NAND gates at this moment are exactly the same as those at $t=t_3$ in FIG. 4.

At $t=t_{16}$, the signal level at terminal X turns from H to L, then the output level of NAND gate a turns from L to H, but output levels of other NAND gates show no change.

At $t=t_{17}$, the signal level at terminal Y turns from L to H, then the output level of NAND gate g turns from L to H. As the output level of NAND gate j turns from H to L, the output level of NAND gate k turns from L to H, and hence, the output level of NAND gate l turns from H to L. At this time, levels at both input terminals 1$f$ and 3$f$ of NAND gate f are H.

The operations of the NAND gates g, j, k and l at this moment are exactly the same as those of the NAND gates g, j, k and l as $t=t_4$ as shown in FIG. 4.

At $t=t_{18}$, the signal level at terminal X turns from L to H, then the output level of said NAND gate f turns from H to L, and output levels of NAND gate e and NAND gate i turn from L to H. Accordingly, output levels of NAND gate d, NAND gate b, NAND gate h and NAND gate k turn from H to L, and the output level of NAND gate l turns from L to H. Immediately after this moment, the output level of NAND gate c turns from H to L, and the output level of NAND gate d turns from L to H and another new cycle period begins. Since the output level of NAND gate k turns from H to L, just after the output level of NAND gate f turns from H to L, so the output level of said NAND gate f soon goes back to H. At the same time, since the output level of said NAND gate d turns from L to H, the output level of NAND gate e turns from H to L, and the output level of NAND gate b turns from L to H, and hence, the output level of NAND gate a becomes L.

The output levels of all NAND gates at this moment are exactly the same as those soon after $t=t_{14}$.

At $t=t_{19}$, the output level of NAND gate g turns from H to L, accordingly, the output level of NAND gate h turns from L to H, and hence, the output level of NAND gate i turns from H to L.

The operations of all NAND gates at this moment are exactly the same as those at $t=t_{15}$.

At $t=t_{20}$, the signal level at terminal X turns from H to L, then the output level of NAND gate a only turns from L to H.

The operations of all NAND gates at this moment are exactly the same as those at $t=t_{16}$.

At $t=t_{21}$, the signal level at terminal Y turns from L to H, then the output level of NAND gate g turns from L to H. Therefore, the output level of NAND gate j turns from H to L, the output level of NAND gate k turns from L to H, and hence, the output level of NAND gate l turns from H to L.

The operations of all NAND gates at this moment are exactly the same as those at $t=t_{17}$.

At $t=t_{22}$, the signal level at terminal X turns from L to H, then the output level of NAND gate f turns from H to L. Thereafter, the same function repeats. That means, when the output level of NAND gate k is H, upon turning of the signal level at terminal X from L to H for example at $t=t_{18}$ or $t=t_{22}$, the NAND gate f generates a reset pulse of L level. The reset pulse forcively resets the NAND gates e and i, and hence resets whole monostable circuit of FIG. 3 to the initial state at $t=t_0$. Therefore, the circuit can be triggered again by the turning from L to H of the input terminal X. Namely, by the function of the NAND gate f, the monostable circuit of FIG. 3 is reset in a manner not to lose reaction for the next trigger pulse to the input terminal X.

In the circuit, shown in FIG. 6, a first signal input terminal X is connected to an input terminal 2$c$ of a 3-input NAND gate c, an input terminal 1$v$ of inverter v and an input terminal 1$t$ of a 2-input NAND gate t. A second signal input terminal Y is connected to an input terminal 3$c$ of the 3-input NAND gate c, an input terminal in of inverter n and an input terminal 2$j$ of a 2-input NAND gate j. An output terminal 0$c$ of the 3-input NAND gate c is connected to an input terminal 2$d$ of a 2-input NAND gate d. An output terminal 0$d$ of the 2-input NAND gate d is connected to an input terminal 2$e$ of a 2-input NAND gate e and an input terminal 1$g$ of the 2-input NAND gate g. An output terminal 0$e$ of the 2-input NAND gate e is connected to an input terminal 1$d$ of the 2-input NAND gate d. An output 0$g$ of the 2-input NAND gate g is connected to an input terminal 2$h$ of a 2-input NAND gate h. An output terminal 0$h$ of the 2-input NAND gate h is connected to an input terminal 2$i$ of a 2-input NAND gate i and an input terminal 1$j$ of a 2-input NAND gate j. An output terminal 0$j$ of the 2-input NAND gate i is connected to an input terminal 1$h$ of the 2-input NAND gate h and to an input terminal 1$o$ of inverter o. An output terminal 0$o$ of the inverter o is connected to an output terminal Z. On the other hand, an output terminal 0$t$ of the 2-input NAND gate t is connected to an input terminal 1$u$ of a 2-input NAND gate u and to each one terminals of an input terminal 2$a$ of 4-input NAND gate a, an input terminal 2$b$ of 4-input NAND gate b, an input terminal 1$e$ of 3-input NAND gate e, an input terminal 1$k$ of 3-input NAND gate k and an input terminal 1$q$ of 3-input NAND gate q.

An output terminal 0$u$ of the 2-input NAND gate u is connected to an input terminal 1$w$ of a 2-input NAND gate w and input terminal 1$x$ of 2-input NAND gate x. An output terminal 0$v$ of the inverter v is connected to an input terminal 2$w$ of the 2-input NAND gate w. An output 0$w$ of the 2-input NAND gate w is connected to an input terminal 2$x$ of the 2-input NAND gate x. An output terminal 0$x$ of the 2-input NAND gate x is connected to an input terminal 2$t$ of the 2-input NAND gate t and an input terminal 2$u$ of the 2-input NAND gate u.

6 NAND gates, 4-input NAND gate a, 4-input NAND gate b, 2-input NAND gate c, 2-input NAND gate d, 3-input NAND gate e and 2-input NAND gate f, form a pair of well known Trigger-flip-flop (T-FF). Likewise 3-input NAND gate g, 3-input NAND gate h, 2-input NAND gate i, 2-input NAND gate j, 3-input NAND gate k and 2-input NAND gate l as well as 3-input NAND gate m, 3-input NAND gate n, 2-input NAND gate o, 2-input NAND gate p, 3-input NAND gate q and 2-input NAND gate r also form a second and a third pair of T-FF.

An output terminal 0j of the 2-input NAND gate j is connected to an input terminal of a 4-input NAND gate a and an input terminal of a 4-input NAND gate b in the first-stage T-FF. An output terminal 0f of 2-input NAND gate f in the first-stage T-FF, is connected to an input terminal 2g of 3-input NAND gate g and an input terminal 2h of 3-input NAND gate h, which build 2nd-stage T-FF. An output terminal 0l of a 2-input NAND gate 1 in the 2nd-stage T-FF is connected to an input terminal 2m of 3-input NAND gate m and input terminal 2n of 3-input NAND gate n in the 3rd-stage T-FF.

An output terminal 0a of said 4-input NAND gate a is connected to input terminal 1y of inverter y. An output terminal 0y of said inverter y is connected to input terminal 1s of 3-input NAND gate s. An output terminal 0k of 3-input NAND gate k in the 2nd-stage T-FF is connected to input terminal 2s of said 3-input NAND gate s. An output terminal 0q of 3-input NAND gate q in the 3rd-stage T-FF is connected to input terminal 3s of said 3-input NAND gate s. An output terminal 0s of said 3-input NAND gate s is connected to input terminal 1c of 3-input NAND gate c, input terminal 1e of said 2-input NAND gate e and input terminal 1i of said 2-input NAND gate i. An output terminal On of said inverter is connected to input terminal 2g of said 2-input NAND gate g.

In the circuit shown in FIG. 6, since 3 pairs of T-FFs, built by 6 NAND gates respectively, are well known structures, detailed explanation on the function is not given here. When the signal wave, shown in FIG. 7-t, is applied to input terminal 2a of NAND gate a, input terminal 2b of NAND gate b, input terminal 1e of NAND gate e, input terminal 1k of NAND gate k and input terminal 1q of NAND gate q, and also, the signal wave, shown in FIG. 7-j, is applied to input terminal 3a of said NAND gate a and input terminal 3b of said NAND gate b, then the changes of output signal level of NAND gates a, b, c, d, e, f, k, l, q and r are as shown by curves a, b, c, d, e, f, k, l, q and r of FIG. 7, respectively.

On the other hand NAND gates t, u, w and x, and inverter v form a trigger pulse generating circuit of negative direction, and its function is as follows:

First, when the voltage, applied to input terminal 1t of NAND gate t and input terminal 1v of inverter v is at L level, the output level of each NAND gate is determined uniquely, for NAND gate t H, for NAND gate w H, for NAND gate u L and for NAND gate x H.

That means, the level at output terminal 0t of NAND gate t becomes H, since the level of other input terminal 1t is L. When the level of NAND gate u is H, that is, the level of its output terminal 0u is H, the level of its input terminal 2u must be L. In order that the level of input terminal 2u of the NAND gate u is L, the level of output terminal 0x of NAND gate x needs to be L, this means that the level of input terminal 2x of the NAND gate x needs to be H. In order that the level of input terminal 2x of said NAND gate x is H, the level of input terminal 2w of NAND gate w must be L.

However, as the level of input terminal 1y of inverter y is L, that of input terminal 2w of said NAND gate w is H. That is, if the level of said input terminal 1y is L, that of output terminal 0u of said NAND gate u can not be H, but is surely L.

If levels of said input terminals 1t and 1v suddenly turn from L to H, as the level of input 2t of NAND gate t is H, that of output terminal 0t of said NAND gate t turns from H to L, and hence, the level of output terminal 0u of NAND gate u turns from L to H.

Accordingly, the level of input terminal 1x of NAND gate x turns from L to H, and the level of output terminal 0x of said NAND gate x turns from H to L, then that of output terminal 0t of NAND gate t goes back to H from L. These action last for only a short time and the level of output terminal 0t of said NAND gate t turns from H to L for a quite short time, at the moment when the input level turns from L to H.

While levels of said input terminal 1t and 1v hold H, output terminal 0w of NAND gate w is H, output terminal 0u of NAND gate u H and output terminal 0x of NAND gate x L. At the moment when levels of said input terminals 1t and 1v suddenly turn from H to L, the level of output terminal 0w of said NAND gate w turns from H to L, since the level of input terminal 1w of NAND gate w has changed to H. Accordingly, the level of output terminal 0x of said NAND gate x rises from L to H. At this time, the level of output terminal 0t of NAND gate t turns from H to L for a quite short time.

While levels of said input terminals 1t and 1v hold L, as described above, the level of output terminal 0t of NAND gate t is H, output terminal 0w of NAND gate w H, the level of output terminal 0u of NAND gate u L, the level of output 0x of NAND gate x H.

After this time, every time when levels of input terminal 1t and 1v turn from L to H, or from H to L, they repeat same operational function. When levels of said input terminal 1t and 1v change as shown in FIG. 7-j, the level of output terminal 0t of NAND gate t becomes as shown by curve t of FIG. 7. That is, as the positive change of the input signal, a negative trigger pulse is generated at output terminal 0t of NAND gate t.

When the signal wave, as shown in FIG. 7, is applied at input terminals X and Y, first NAND gate t generates a negative trigger pulse i.e. a reset pulse, as the signal level, applied to terminal X, changes from L to H, this makes output levels of NAND gate a, b, e, k and q H, so the output level of NAND gate s also becomes H.

Accordingly, at output terminal 0c of NAND gate c, the output signal of the waveform of opposite polarity to that applied to the input terminal Y, i.e. input terminal 3c of said NAND gate c, comes out while levels of input terminal 1c and 2c hold H.

Since the output level of NAND gate s becomes L before the signal level at the input terminal X, changes from L to H, the output levels of NAND gate e and NAND gate i are H, and output levels of NAND gate d and NAND gate h are L.

At the moment when the output level of said NAND gate c turns from H to L, the output level of said NAND gate d turns from L to H and the output level of said NAND gate e oppositely turns from H to L. After the moment when the output level of said NAND gate d becomes H, the signal with the same waveform to that applied to input terminal Y, comes out at output terminal 0g of NAND gate g.

At the moment when the output level of said NAND gate g turns from H to L, the output level of NAND gate h turns from L to H and the output level of NAND gate i oppositely turns from H to L. After the moment when the output level of said NAND gate h, which has the inverted signal waveform to that applied to the input terminal Y, comes out at output terminal 0j of NAND gate j. In this way, the output level of NAND gates c, d, e, g, h, i and j change like in FIGS. 7-c, d, e, g, h, i and j.

When a signal, of curve j of FIG. 7, is applied to the input terminal of the first-stage T-FF and also a signal of curve t of FIG. 7 is applied to the signal input line for resetting, output levels of NAND gate a, b, c, d, e, f, k, l, q, and r, which form a flip-flop (F—F), change as shown by curves a, b, c, d, e, f, k, l, q and r of FIG. 7, respectively. At the moment when the output level of NAND gate a becomes L, the output level of NAND gate k H and the output level of NAND gate q H, then, the output level of NAND gate s turns from H to L, thereby turning all output levels of NAND gates c, e and i to H. Incidentally, when the signal level at terminal X is already L before the output level of said NAND gate s becomes L, the output level of said NAND gate c becomes H at this time.

This condition holds until the F—F is reset by NAND gate t, changing the signal level at terminal X from L to H.

Referring to the circuit in FIG. 6, when the signal levels at terminal X and terminal Y change as shown by curve X and Y of FIG. 7, the inverted signal of the output signal of NAND gate i appears at output terminal Z, its signal waveform is shown by the curve Z of FIG. 7.

As seen from the signal waveform in the curve Z of FIG. 7, the output signal of the circuit, shown in FIG. 6, possesses an astable period corresponding to 7 cycles of the signal applied to the terminal Y, that is in one cycle of the signal applied to the terminal X. When the one-cycle period of the signal applied to the terminal X is shorter than the 7-cycle period of the signal applied to the terminal Y, then the signal level at the output terminal Z holds H.

Now referring to the rotating speed control apparatus of a turntable shown in FIG. 1. The change-over switch 10 is used for selecting the turntable speed to 33⅓ rpm or 45 rpm. Dividing ratio n of the divider 11 is suitably set in accordance to the oscillator frequency of the reference oscillator 7, in order that signal frequencies applied to both input terminals of the phase comparator 4 are equal to one another.

When the moving contact 10c of said change-over switch 10 is at the position of the fixed contact 10a, the rotating speed of the turntable is controlled to be 33⅓ rpm. The apparatus shown in FIG. 1 comprises 5 blocks a reference frequency generator circuit with the reference oscillator 7 and divider 8 or with divider 9 and divider 11 (reference frequency signal system), speed signal detector system with speed detector 2 and amplifier 3, phase control system with the phase comparator 4, frequency control system with the monostable circuit 5, and rotating speed control system with the mixing circuit 12, motor driving circuit 13 and motor 1.

Main control mechanism of the apparatus shown in FIG. 1 is phase control. The output phase signal of the amplifier 3, i.e. the detecting phase signal from the speed detector 2 and the reference phase signal from divider 11, the reference frequency generator circuit, are compared and so controlled that their phase difference always keeps a constant value. Although a phase comparator has generally a finite gain for some phase difference, it has no gain for a frequency difference of the signals applied to the input terminals. Therefore, with phase control system only, the transient response to the rotary machine becomes quite unstable. In order to overcome this shortcoming, the present invention employs a frequency control system in addition to the synchronous drawing means.

For example, in the case of the apparatus in FIG. 1, the rotating speed of the motor 1 is controlled by frequency control system with the monostable circuit 5 to make it come near the predetermined value when the rotating speed deviates much from the setting value. Thereafter by the phase controlling system with the phase comparator 4, phase difference between the detector phase signal from the speed detector 2 (the rotating phase signal of the motor 1) and the reference phase signal from the divider 11, is controlled to a constant value.

When the traveling contact 10c of the changeover switch 10 is in position for fixed contact 10b, the frequency of the reference phase signal applied to the input terminal 4a of the phase comparator 4 increases, and astable period of the monostable circuit 5 becomes shorter. As the astable period of said monostable circuit 5 becomes shorter, the average output signal level appearing at its output terminal Z decreases, and motor driving circuit 13 operates to accelerate the rotating speed of the motor 1.

When the rotating speed of said motor 1 is accelarated and the average output signal level of said monostable circuit 5 goes back to the target value, i.e., when the ratio of H level period and that of L level of said output signals become a value for that when the moving contact 10c of the change-over switch 10 is in position for the fixed contact 10a, then two frequencies of the reference phase signal applied to the input terminal 4a of the phase comparator 4 and the phase signal of the detector applied to said phase comparator 4b become equal. Thus, this time the phase control is carried out. As like this, with the rotating speed control apparatus of the rotary machine in the invention, astable period of the monostable circuit is automatically changed over, according to the change of the reference frequency signal. Accordingly, there is no need to reset the astable period of the monostable circuit by, for example, linking together the frequency change-over switch like the conventional art. In addition, in the case that the reference oscillator 7 is built as a variable frequency oscillator, it also follows the continuously changing reference frequency automatically, and astable period of the monostable circuit 5 changes. This leads that the average output level of the frequency control system can always be kept constant and optimum control is possible.

In the conventional apparatus of this kind, instead of monostable circuit 5, a usual monostable multivibrator has been used to change the rotating speed of the motor, by changing the time constant of charging and discharging of a capacitor. However, in this invention by installing another reference oscillator and changing its frequency or making it variable, it is possible to change or vary the rotating speed of the motor. By employing a reference oscillator, which is quite stable in the frequency change, stability of the rotating speed of the motor also becomes high.

Figure 8:
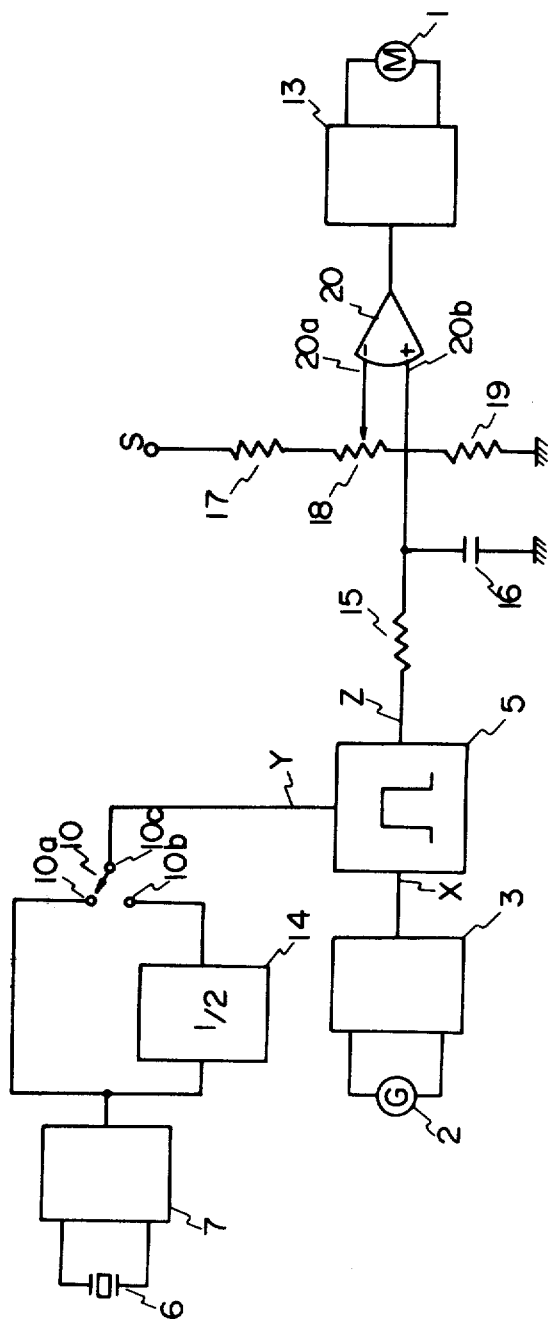
FIG. 8 is a block diagram which illustrates a rotating speed control apparatus of rotary machine of another practical example of the present invention.

For example, instead of the reference oscillator 7 in FIG. 8, use of commercial power source of frequency of 50 Hz or 60 Hz/100 Hz or 120 Hz signal is expected to improve the stability much.

As shown above, according to the rotating speed control apparatus of the rotary machine of this invention, the astable period is determined by the output frequency from the reference frequency generator.

Since frequency control system consists of the monostable circuit, whose repetition period for the output signal depends on repetition period of the output signal from the speed detector, astable period of said monostable circuit automatically changes in accordance with the change or variation of the reference frequency. The present invention has high utility for achieving control with high accuracy with a simple configuration.

What I claim is:

1. A speed controller for a rotary machine comprising:
   a speed detector for generating a first signal corresponding to the rotating speed of said rotary machine;
   a reference frequency generator for generating a second signal having a controllable frequency;
   a divider coupled to the output of said reference frequency generator for developing a reference phase signal by dividing said output signal from said reference frequency generator;
   a phase comparator for receiving said first signal from said speed detector and said reference phase signal from said divider and developing a comparison signal related to the phase difference therebetween;
   synchronous pull-in circuit means, having a first control input coupled to said speed detector and a second control input coupled to said reference frequency generator for developing a pull-in signal having a repetition period related to said first signal and an astable period related to said second signal;
   a mixer for mixing said comparison signal from said phase comparator and said pull-in signal from said synchronous pull-in circuit means; and
   a means coupled to said mixer for driving said rotary machine responsive to the output of said mixer.

2. A speed controller for a rotary machine according to claim 1, wherein said synchronous pull-in circuit means comprises:
   a first pair of NAND gates for inverting an output state thereof by a level change of said first signal at said first control terminal from "low" to "high";
   a second pair of NAND gates for inverting an output state thereof by a level change of said second signal at said second control terminal after the inversion of said output state of said first pair of NAND gates; and
   a counter which stops counting after counting a specified number of cycles of said first signal at said first control terminal following the inversion of said output state of said second group of NAND gates.

3. A speed controller for a rotary machine comprising:
   a speed detector for coupling to said rotary machine and for generating a speed detector signal corresponding to the rotating speed of said rotary machine;
   a reference signal generator for generating a reference signal having a controllable frequency;
   a phase comparator coupled to said speed detector and to said reference frequency generator for comparing said speed detector and reference signals and for generating an error signal for use in controlling the speed of said rotary machine; and
   means coupled to said speed detector signal and to said reference signal for pulling into phase lock said speed detector and said reference signal, said means for pulling into phase lock comprising:
   first circuit means for generating a pull-in signal having an average level related to said speed detector signal and to said reference signal said first circuit means including second circuit means for generating said pull-in signal having an astable period corresponding to a first predetermined number of cycles of said reference signal occurring during a second predetermined number of cycles of said speed detector signal and having a frequency related to said speed detector signal only; and
   means for mixing said pull-in signal with said error signal the resulting signal for use in controlling the speed of said rotary machine.

4. A speed controller for a rotary machine comprising:
   a speed detector for coupling to said rotary machine and for generating a speed detector signal corresponding to the rotating speed of said rotary machine;
   a reference signal generator for generating a reference signal having a controllable frequency;
   a phase comparator coupled to said speed detector and to said reference frequency generator for comparing said speed detector and reference signals and for generating an error signal for use in controlling the speed of said rotary machine; and
   means coupled to said speed detector signal and to said reference signal for pulling into phase lock said speed detector and said reference signal wherein said means for pulling into phase lock develops a pull-in signal having an astable period corresponding to a predetermined number of cycles of said reference signal in one cycle of said speed detector signal.

5. A speed controller for a rotary machine comprising:
   a speed detector for coupling to said rotary machine for generating a speed detector signal corresponding to the rotating speed of said rotary machine;
   a reference signal generator for generating a reference signal having a controllable frequency;
   a phase comparator coupled to said speed detector and to said reference frequency generator for comparing said speed detector and reference signals and for generating an error signal for use in controlling the speed of said rotary machine; and
   means coupled to said speed detector signal and to said reference signal for pulling into phase lock said speed detector and said reference signal;
   said means for pulling into phase lock comprising first circuit means for generating a pull-in signal having an average level related to said speed detector signal and to said reference signal, and means for mixing said pull-in signal with said error signal, the resulting signal being for use in controlling the speed of said rotary machine;
   said first circuit means including second circuit means for generating said pull-in signal having an astable period corresponding to a first predetermined number of cycles of said reference signal occurring during a second predetermined number of cycles of said speed detector signal and having a frequency related to said speed detector signal only, whereby said synchronous pull-in circuit means develops said pull-in signal having an astable period corresponding to a predetermined number of cycles of said reference signal in one cycle of said speed detector signal.

* * * * *